United States Patent
Cooper et al.

(10) Patent No.: US 11,205,093 B2
(45) Date of Patent: Dec. 21, 2021

(54) SYSTEMS AND METHODS FOR TRAINING MACHINE MODELS WITH AUGMENTED DATA

(71) Applicant: Tesla, Inc., Palo Alto, CA (US)

(72) Inventors: Matthew John Cooper, Providence, RI (US); Paras Jagdish Jain, Cupertino, CA (US); Harsimran Singh Sidhu, Fremont, CA (US)

(73) Assignee: Tesla, Inc., Palo Alto, CA (US)

( * ) Notice: Subject to any disclaimer, the term of this patent is extended or adjusted under 35 U.S.C. 154(b) by 47 days.

(21) Appl. No.: 16/598,956

(22) Filed: Oct. 10, 2019

(65) Prior Publication Data

US 2020/0117953 A1 Apr. 16, 2020

Related U.S. Application Data

(60) Provisional application No. 62/744,534, filed on Oct. 11, 2018.

(51) Int. Cl.
*G06K 9/62* (2006.01)
*G06K 9/00* (2006.01)

(52) U.S. Cl.
CPC ....... *G06K 9/6256* (2013.01); *G06K 9/00791* (2013.01); *G06K 9/6232* (2013.01); *G06K 9/6257* (2013.01)

(58) Field of Classification Search
None
See application file for complete search history.

(56) References Cited

U.S. PATENT DOCUMENTS

2020/0202216 A1* 6/2020 Martinez-Canales .... G06N 3/08

OTHER PUBLICATIONS

Devries et al., Aug. 15, 2017, Improved regularization of convolutional neural networks with cutout, Cornell University Library 8 pp.
Zhong et al., Aug. 16, 2017, Random erasing data augmentation, Corneil University Library, 10 pp.
International Search Report and Written Opinion dated Jan. 21, 2020 in application No. OCT/US2019/0555683.

* cited by examiner

*Primary Examiner* — Casey L Kretzer
(74) *Attorney, Agent, or Firm* — Knobbe, Martens, Olson & Bear, LLP

(57) ABSTRACT

Systems and methods for training machine models with augmented data. An example method includes identifying a set of images captured by a set of cameras while affixed to one or more image collection systems. For each image in the set of images, a training output for the image is identified. For one or more images in the set of images, an augmented image for a set of augmented images is generated. Generating an augmented image includes modifying the image with an image manipulation function that maintains camera properties of the image. The augmented training image is associated with the training output of the image. A set of parameters of the predictive computer model are trained to predict the training output based on an image training set including the images and the set of augmented images.

20 Claims, 4 Drawing Sheets

SYSTEMS AND METHODS FOR TRAINING MACHINE MODELS WITH AUGMENTED DATA

CROSS-REFERENCE TO RELATED APPLICATIONS

This application claims priority to U.S. Prov. App. No. 62/744,534, which was filed on Oct. 11, 2018 and which is entitled "TRAINING MACHINE MODELS WITH DATA AUGMENTATION THAT RETAINS SENSOR CHARACTERISTICS." U.S. Prov. App. No. 62/744,534 is hereby incorporated herein by reference in its entirety.

Any and all applications for which a foreign or domestic priority claim is identified in the Application Data Sheet as filed with the present application are hereby incorporated by reference in their entirety under 37 CFR 1.57.

BACKGROUND

Embodiments of the invention relate generally to systems and methods for training data in a machine learning environment, and more particularly to augmenting the training data by including additional data, such as sensor characteristics, in the training data set.

In typical machine learning applications, data may be augmented in various ways to avoid overfitting the model to the characteristics of the capture equipment used to obtain the training data. For example, in typical sets of images used for training computer models, the images may represent objects captured with many different capture environments having varying sensor characteristics with respect to the objects being captured. For example, such images may be captured by various sensor characteristics, such as various scales (e.g., significantly different distances within the image), with various focal lengths, by various lens types, with various pre- or post-processing, different software environments, sensor array hardware, and so forth. These sensors may also differ with respect to different extrinsic parameters, such as the position and orientation of the imaging sensors with respect to the environment as the image is captured. All of these different types of sensor characteristics can cause the captured images to present differently and variously throughout the different images in the image set and make it more difficult to properly train a computer model.

Many applications of neural networks learn from data captured in a variety of conditions and are deployed on a variety different sensor configurations (e.g. in an app that runs on multiple types of mobile phones). To account for differences in the sensors used to capture images, developers may augment the image training data with modifications such as flipping, rotating, or cropping the image, which generalize the developed model with respect to camera properties such as focal length, axis skew, position, and rotation.

To account for these variations and deploy the trained network on various sources, training data may be augmented or manipulated to increase robustness of the trained model. These approaches, however, typically prevent models from learning effectively for any particular camera configuration by applying transformations that modify camera properties in the augmented images.

SUMMARY

One embodiment is a method for training a set of parameters of a predictive computer model. This embodiment may include: identifying a set of images captured by a set of cameras while affixed to one or more image collection systems; for each image in the set of images, identifying a training output for the image; for one or more images in the set of images, generating an augmented image for a set of augmented images by: generating an augmented image for a set of augmented images by modifying the image with an image manipulation function that maintains camera properties of the image, and associating the augmented training image with the training output of the image; training the set of parameters of the predictive computer model to predict the training output based on an image training set including the images and the set of augmented images.

An additional embodiment may include a system having one or more processors and non-transitory computer storage media storing instructions that when executed by the one or more processors, cause the processors to perform operations comprising: identifying a set of images captured by a set of cameras while affixed to one or more image collection systems; for each image in the set of images, identifying a training output for the image; for one or more images in the set of images, generating an augmented image for a set of augmented images by: generating an augmented image for a set of augmented images by modifying the image with an image manipulation function that maintains camera properties of the image, and associating the augmented training image with the training output of the image; training the set of parameters of the predictive computer model to predict the training output based on an image training set including the images and the set of augmented images.

Another embodiment may include a non-transitory computer-readable medium having instructions for execution by a processor, the instructions when executed by the processor causing the processor to: identify a set of images captured by a set of cameras while affixed to one or more image collection systems; for each image in the set of images, identify a training output for the image; for one or more images in the set of images, generate an augmented image for a set of augmented images by: generate an augmented image for a set of augmented images by modifying the image with an image manipulation function that maintains camera properties of the image, and associate the augmented training image with the training output of the image; train the computer model to learn to predict the training output based on an image training set including the images and the set of augmented images.

Figure 1:
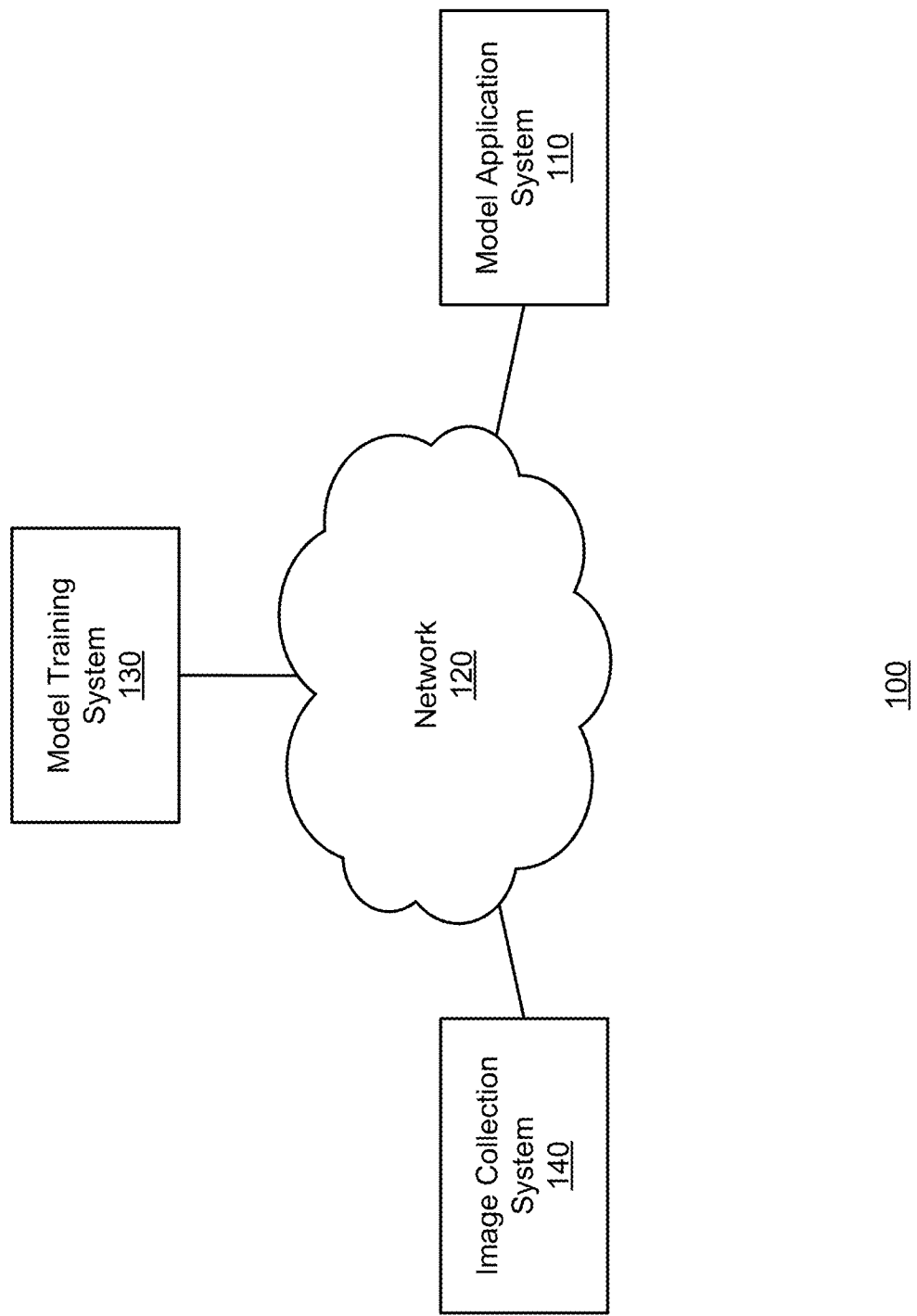
FIG. 1 is block diagram of an environment for computer model training and deployment according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

One embodiment is a system that trains a computer model with images which have been augmented to maintain the camera properties of the originally-captured images. These camera properties may include intrinsic or extrinsic properties of the camera. Such intrinsic properties may include characteristics of the sensor itself, such as dynamic range, field of view, focal length, and lens distortion. Extrinsic properties may describe the configuration of the camera with respect to the captured environment, such as the angle, scale, or pose of a camera.

These intrinsic and extrinsic properties may affect the view of the camera with respect to objects and other aspects captured in the image and artifacts and other effects, such as static objects appearing in view of the camera because of its positioning on a device or system. For example, a camera mounted on a vehicle may include, as a portion of its view, a hood of the car that appears across many images and for all cameras in that configuration mounted in the same way on the same model of car. As another example, these camera properties may also include reflections coming off objects within the view of the camera. The reflections may be one type of consistent characteristic that becomes included with many of the images captured by the camera.

By maintaining, saving, storing or using the camera properties of the images to train data models while still adding to the training data with augmented images, the resulting model may be useful across many different devices having the same camera properties. Moreover, the augmentation may provide generalization and greater robustness to the model prediction, particularly when images are clouded, occluded, or otherwise do not provide clear views of the detectable objects. These approaches may be particularly useful for object detection and in autonomous vehicles. This approach may also be beneficial for other situations in which the same camera configurations may be deployed to many devices. Since these devices may have a consistent set of sensors in a consistent orientation, the training data may be collected with a given configuration, a model may be trained with augmented data from the collected training data, and the trained model may be deployed to devices having the same configuration. Accordingly, these techniques avoid augmentation that creates unnecessary generalization in this context and permits generalization for other variables with some data augmentation.

To maintain camera properties, the image manipulation function used to generate an augmented image is a function that maintains the camera properties. For example, these manipulations may avoid affecting angle, scale, or pose of the camera with respect to the captured environment. In embodiments, no images are used in training that were augmented with image manipulation functions that affect camera properties. For example, image manipulation functions that may be used to maintain camera properties include cutout, hue/saturation/value jitter, salt and pepper, and domain transfer (e.g., modifying day to night). Those functions which may modify camera properties, and thus are not used on some embodiments, include cropping, padding, flipping (horizontal or vertical), or affine transformations (such as sheer, rotate, translate, and skew).

As a further example, the images may be augmented with a "cutout" function that removes a portion of the original image. The removed portion of the image may then be replaced with other image content, such as a specified color, blur, noise, or from another image. The number, size, region, and replacement content for cutouts may be varied and may be based on the label of the image (e.g., the region of interest in the image, or a bounding box for an object).

A computer model may thus be trained with the images and the augmented images and distributed to device having camera characteristics of the captured images to use the model in sensor analysis. In particular, this data augmentation and model training may be used for models trained to detect objects or object bounding boxes in images.

FIG. 1 is an environment for computer model training and deployment according to one embodiment. One or more image collection systems 140 capture images that may be used by the model training system in training a computer model, which may be deployed and used by a model application system. These systems are connected via a network 120, such as the internet, representing various wireless or wired communication links through which these devices communicate.

A model training system 130 trains a computer model having a set of trainable parameters for predicting an output given a set of inputs. The model training system 130 in this example typically trains models based on image inputs to generate an output predicting information about the image. For example, in various embodiments these outputs may identify objects in the image (identify objects, either by bounding box or by segmentation, may identify conditions of the image (e.g., time of day, weather) or other tags or descriptors of the image.

Although an image is used herein as an example type of sensor data for convenience, the augmentation and model development as described herein may be applied to a variety of types of sensors to augment training data captured from these sensors while maintaining sensor configuration characteristics.

The image collection system 140 has a set of sensors that capture information from the environment of the image collection system 140. Though one image collection system 140 is shown, many image collection systems 140 may capture images for the model training system 130. The sensors for the image collection system 140 have sensor characteristics that may be the same or substantially the same across the image collection systems 140. The image collection system in one embodiment is a vehicle or other system that moves in an environment and captures images of the environment with a camera. The image collection system 140 may be manually operated or may be operated be a partially-or fully-automated vehicle. Thus, as the image collection system 140 traverses the environment, the image collection system 140 may capture and transmit images of the environment to the model training system 130.

The model application system 110 is a system having a set of sensors having the same or substantially the same sensor characteristics as the image collection system. In some examples, the model application system 110 also serves as an image collection system 130 and provides captured sensor data (e.g., images) to the model training system 130 to use as further training data. The model application system 110 receives a trained model from the model training system 130 and uses the model with the data sensed by its sensors. Because images captured from image collection systems 140 and the model application system 110 have the same camera configuration, the model application system 110 may capture its environment in the same way and from the same perspective (or substantially similar) as the image collection systems. After applying the models, the model application system 110 may use the output of the models for various purposes. For example, when the model application system 110 is a vehicle, the model may predict the presence of objects in the image, which may be used by the model application system 110 as part of a safety system or as a part of an autonomous (or semi-autonomous) control system.

Figure 2:
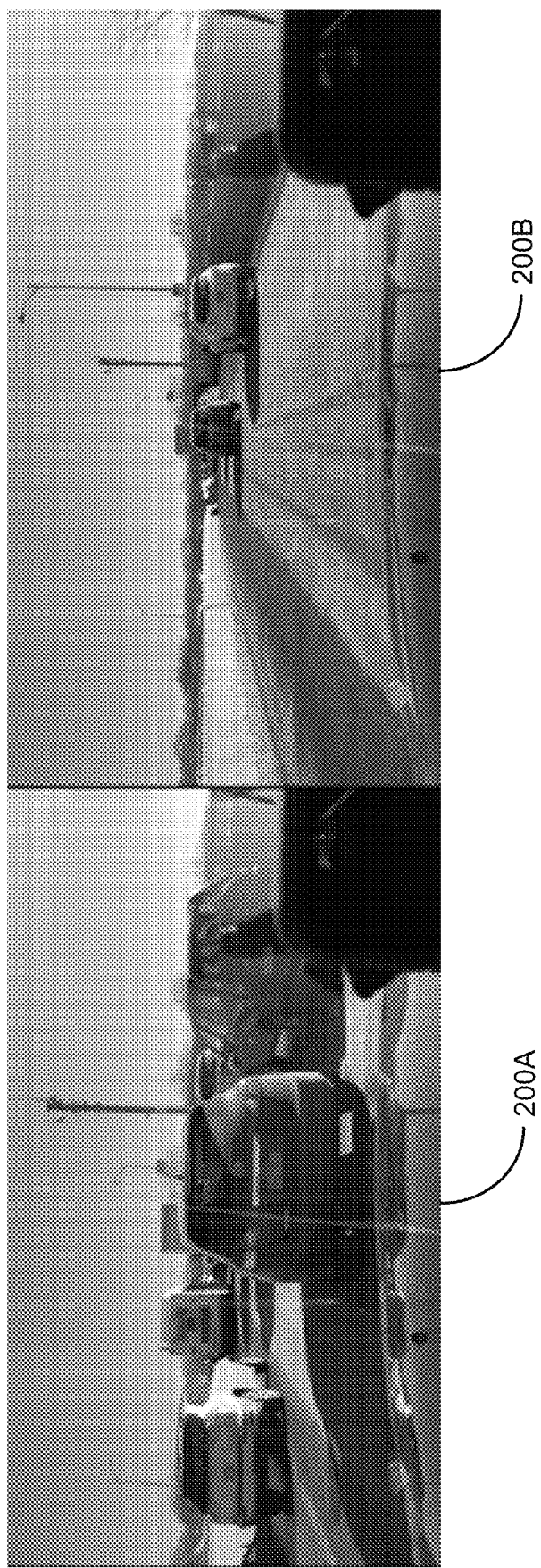
FIG. 2 illustrates example images captured with the same camera characteristics.

FIG. 2 illustrates example images captured with the same camera characteristics. In this example, image 200A is captured by a camera on an image collection system 130. Another image 200B may also be captured by an image collection system 130, which may be the same or may be a different image collection system 130. While capturing different environments and different objects within the environments, these images maintain camera properties with respect to the image capturing the environment. The camera properties refer to the configuration and orientation properties of the camera that affects how the environment appears in the camera. For example, these camera properties may include the angle, scale, and pose (e.g., viewing position) of the camera with respect to the environment. Modifying the angle, scale, or position of the camera, relative to the same environment in which the image is captured, causes the image of the environment to change. For example, a camera placed at a higher position will view an object from a different height and will show a different portion of that object than a lower position. Likewise, these images include consistent artifacts and effects in the image due to the camera configuration that are not part of the environment to be analyzed. For example, both image 200A and 200B include glare and other effects from a windshield, an object on the lower right side of the image occludes the environment, and a windshield occludes the bottom of the image. Accordingly, images captured from the same camera characteristics typically present the same artifacts, distortions, and capture the environment in the same way.

Figure 3:
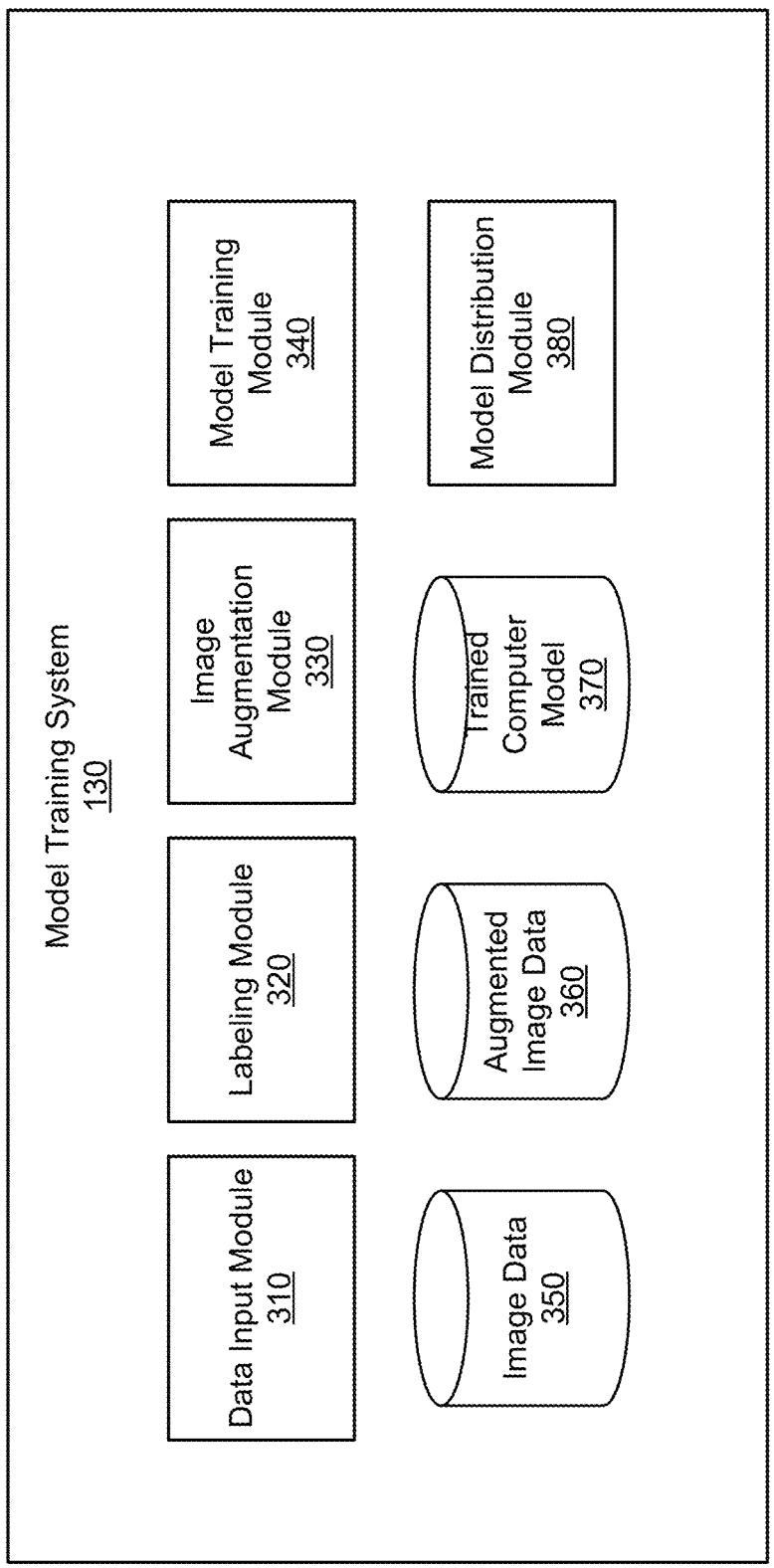
FIG. 3 is a block diagram of components of a model training system, according to one embodiment.

FIG. 3 shows components of the model training system 130, according to one embodiment. The model training system includes various modules and data stores for training a computer model. The model training system 130 trains models for use by the model application system 110 by augmenting images from the image collection system 140 to improve generalization of the model. The augmented images are generated with image manipulation functions that do not affect (e.g., that maintain) the camera configuration of the images. This permits more effective modeling while allowing generalization of model parameters that more selectively avoiding overfitting for the aspects of images that may differ across images, while allowing model parameters to more closely learn weights related to the consistent camera characteristics.

The model training system includes a data input module 310 that receives images from the image collection system 140. The data input module 310 may store these images in an image data store 350. The data input module 310 may receive images as generated or provided by the data collection system 140, or it may request images from the image collection system 140.

The labeling module 320 may identify or apply labels to the images in the image data 350. In some examples, the images may already have identified characteristics. The labels may also represent data that is to be predicted or output by a trained model. For example, a label may designate particular objects in an environment shown in the image, or may include a descriptor or "tag" associated with the image. Depending on the application of the model, the labels may represent this information in various ways. For example, an object may be associated with a bounding box within an image, or an object may be segmented from other parts of the image. The labeled images may thus represent the ground truth for which the model is trained. The images may be labeled by any suitable means, and may typically be by a supervised labeling process (e.g., labeled by users reviewing the images and designating labels for the images). These labels may then be associated with the images in the image data store 350.

The image augmentation module 330 may generate additional images based on the images captured by the image collection system 140. These images may be generated as a part of a training pipeline for the model training module 340, or these augmented images may be generated before initiating training in the model training module 340. The augmented images may be generated based on images captured by the image collection system 140.

Figure 4:
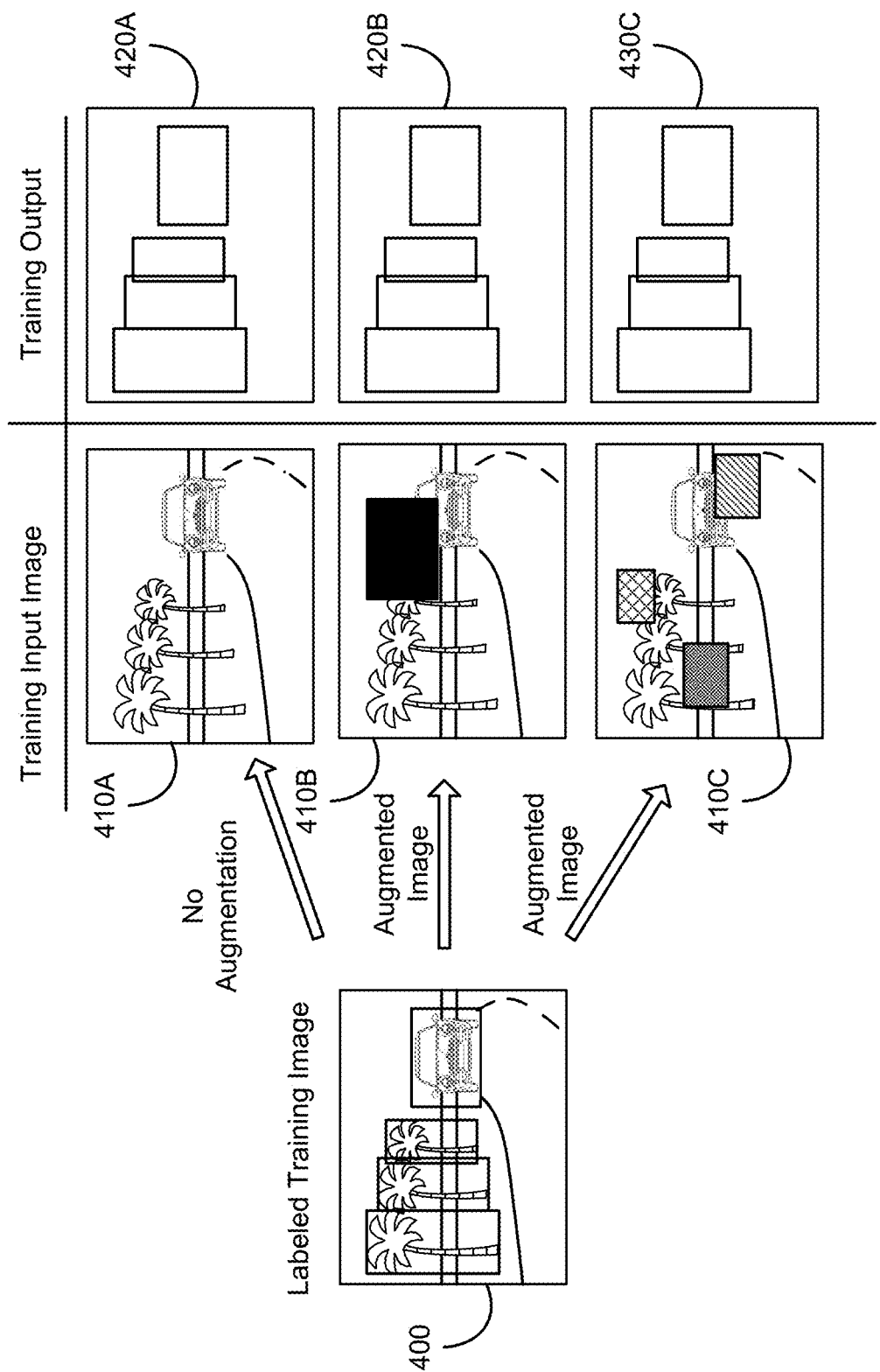
FIG. 4 is a data flow diagram showing an example of generating augmented images based on a labeled training image, according to one embodiment.

FIG. 4 shows example generation of augmented images based on a labeled training image 400, according to one embodiment. The labeled training image may be an image captured by the image collection system 140. The training images 410 may include a training image 410A that is not augmented, having associated training output 420A that corresponds with the labeled data in the labeled training image 400.

The image augmentation module 330 generates augmented images by applying an image manipulation function to the labeled training image 400. The image manipulation function generates a modified version of the labeled training image 400 to vary the characteristics of the image for training the model. The image manipulation function used to generate the training images maintains the camera properties of the labeled training image 400. Thus, the manipulation function may maintain the scale, perspective, orientation, and other characteristics of the view of the environment that may be affected by the physical capture characteristics of the camera or the position of the camera when capturing the environment that may be consistent across various devices. Accordingly, the image manipulation functions may affect how viewable objects or other features of the environment are or how clearly these are seen in a scene, but may not affect the location or size of objects in the image. Example image manipulation functions that may be applied, which maintain camera characteristics, include cutout, jitter (e.g., for hue, saturation, or color value), salt and pepper (introducing black and white dots), blur, and domain transfer. More than one of these image manipulation functions may be applied in combination to generate an augmented image. Cutout refers to an image manipulation function that removes a portion of the image and replaces the removed portion with other image content. Domain transfer refers to an image manipulation function that modifies the image to correspond to another environmental condition in the image. For example, images during the day may be modified to approximate how the image may be seen at night, or an image taken in the sun may be modified to add rain or snow effects.

These augmented images may be associated with the same training output as the labeled training image 400. In the example shown in FIG. 4, the augmented image 410B is generated by applying a cutout to the labeled training image 400, and the augmented image 410B may be associated with training output 420B. Likewise to generate training image 410C, multiple cutouts are applied to modify portions of the image. In this example, the cutouts applied to generate training image 410C fill the cutout region of the image with different patterns.

In various embodiments, the cutouts may be applied with various parameters and configurations, which may vary based on the training image and the location of the training output in the image. Thus, the number, size, location, and replacement image content of the cutout may vary in different embodiments and based on the location of the training output. As examples, the cutout function may apply multiple cutouts of similar size, or may apply several cutouts of different, semi-randomized sizes within a range. By using multiple cutouts and varying the size, the cutouts may more closely simulate the effect of real-world obstructions (of various sizes) on viewing the objects and may prevent the trained model from learning to compensate for cutouts of any one particular size.

The range for the size of the cutouts may be based on a portion of the size of the object or other label within the image. For example, the cutout may be no more than 40% of the size of the object's bounding box in the image, or to be smaller than the smallest object's bounding box. This may ensure that a cutout does not completely obscure a target object, and therefore that the image will continue to include image data of the object that the model may learn from. The number of cutouts may also be randomized and selected from a distribution, such as a uniform, Gaussian, or exponential distribution.

In addition, the location of the cutouts may be selected based on the location of the objects in the image. This may provide some, but not excess overlap, with the bounding box. The intersection between the object and the cutout region may be measured by the portion of the object being replaced by the cutout, or may be measured by the intersection over union (IoU), which may be measured by an intersection of the object and the cutout region divided by the union of the area of the object and the cutout region. For example, the cutout region may be placed to have an intersection over union value within a range of 20% to 50%. By including some, but not an overwhelming amount of the object in the cutout, the cutouts may thus create more "challenging" examples that partially obscure the object without removing too much of the related image data. Similarly, the cutouts may also be selected to certain parts of the image, based on the expected view of the cameras in the image. For example, the cutout may mainly be located in the bottom half of the image or in the center of the image, because the bottom portion may typically include artifacts that are always present, while the center of the image may be a region of most interest (e.g., for a vehicle, is often the direction of travel of the vehicle).

The replacement image data for the cutout region may be a solid color (e.g., a constant) or may be another pattern, such as Gaussian noise. As another example, to represent occlusions or other obstructions, the cutout may be replaced with a patch of image data from another image having the same image type or label. Finally, the cutout may be blended with the regions near the cutout, for example with poisson blending. By using various blending approaches, such as a background patch or blending, these may ensure that the replacement data in the cutout is more difficult to distinguish from the environment, and thus provide a more similar example to real-world obstructions.

Though shown as a rectangular region in FIG. 4, the cutout applied in generating the augmented image may vary in different shapes in other embodiments. After generating the augmented images 410B, 410C and associating the augmented images with related training outputs 420B, 420C, the image augmentation module 330 may add the images to the image data store 350.

The model training module 340 trains a computer model based on the images captured by the image collection system 140 and the augmented images generated by the image augmentation module 330. These images may be used as an image training set for the model training. In one embodiment, the machine-learned models are neural network models such as feed-forward networks, convolutional neural networks (CNN), deep neural networks (DNN), recurrent neural networks (RNN), self-organizing maps (SOM), and the like, that are trained by the model training module 340 based on training data. After training, the computer model may be stored in the trained computer model store 370. A model receives the sensor data (e.g., an image) as an input and outputs an output prediction according to the training of the model. In training the model, the model learns (or "trains") a set of parameters that predict the output based on the input images as evaluated by a loss function for the training data. That is, during training the training data is assessed according to a current set of parameters to generate a prediction. That prediction for the training inputs can be compared with the designated output (e.g., the label) to assess a loss (e.g., with a loss function) and the parameters may be revised via an optimization algorithm to optimize the set of parameters to reduce the loss function. Though termed "optimization," these algorithms may reduce the loss with respect to a set of parameters, but may not be guaranteed to find the "optimal" value of parameters given a set of inputs. For example, a gradient descent optimization algorithm may find a local minima, rather than a global minima.

By training the computer models on augmented training data, the computer models can perform with improved accuracy when they are applied to sensor data from a physical sensor operating in an environment having the sensor characteristics of the captured data. Since the augmentation maintains these characteristics, these sensor characteristics (e.g., camera characteristics) are represented in the images used in training the data. In one embodiment, the training data does not include augmented images generated by image manipulation functions that modify the camera properties of the image, such as operations that crop, pad, flip (vertical or horizontal), or apply affine transformations (e.g., shear, rotation, translation, skew) to the image.

After training, the model distribution module 380 may distribute the trained model to systems to apply the trained model. In particular, the model distribution module 380 may send the trained model (or parameters thereof) to the model application system 110 for use in detecting characteristics of an image based on the sensors of the model application system 110. The predictions from the model may thus be used in operation of the model application system 110, for example in object detection and control of the model application system 110.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus (e.g., a system) for performing the operations herein. This apparatus may be specially constructed for the required purposes, and/or it may comprise a general-purpose computing device selectively activated or reconfigured by a computer program stored in the computer. The computing device may a system or device of one or more processors and/or computer systems. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for training a set of parameters of a predictive computer model, the method comprising:
    identifying a set of images captured by a set of cameras which are affixed to one or more first vehicles, wherein a first plurality of cameras of the set of cameras are affixed to the first vehicles according to respective configurations;
    for each image in the set of images, identifying a training output for the image;
    for one or more images in the set of images, generating an augmented image for a set of augmented images by:
        generating an augmented image for a set of augmented images by modifying the image with an image manipulation function that maintains camera properties of the image, such that angle, scale, and/or pose associated with the image is preserved, and
        associating the augmented training image with the training output of the image;
    training the set of parameters of the predictive computer model to predict the training output based on an image training set including the images and the set of augmented images,
    wherein the trained predictive computer model is configured to predict a presence of objects in input images for use in autonomous or semi-autonomous control of a second vehicle, the second vehicle having a second plurality of cameras affixed to the second vehicle according to the respective configurations.

2. The method of claim 1, wherein an individual configuration indicates a same position and/or orientation with respect to the first vehicles and the second vehicle, and wherein consistent image characteristics are included in images captured by a first camera of the first plurality of cameras which is affixed according to the individual configuration and a second camera of the second plurality of cameras which is affixed according to the individual configuration.

3. The method of claim 1, wherein the image training set does not include images generated by image manipulation functions that modify camera properties of an image.

4. The method of claim 3, wherein the image manipulation functions that modify camera properties include crop, pad, horizontal or vertical flip, or affine transformations.

5. The method of claim 1, wherein the image manipulation function is cutout, hue, saturations, value jitter, salt and pepper, domain transfer or any combination thereof.

6. The method of claim 1, wherein the image manipulation function is a cutout applied to the image, wherein a location of the cutout is selected based on an expected view of the first camera with respect to the first vehicles, and wherein the location includes a center of the image which depicts a direction of travel.

7. The method of claim 1, wherein the image manipulation function is a cutout applied to a portion of the image, wherein a location of the cutout is selected based on an expected view of a first camera, of the first plurality of cameras, with respect to the first vehicles, and wherein the location includes artifacts which are always present in images captured by the first camera.

8. The method of claim 1, wherein the image manipulation function is a cutout applied to a portion of the image that partially overlaps with the location of the training output in the image, the cutout being a solid color and the cutout being blended with regions near the cutout.

9. A system comprising one or more processors and non-transitory computer storage media storing instructions that when executed by the one or more processors, cause the processors to perform operations comprising:
    identifying a set of images captured by a set of cameras which are affixed to one or more first vehicles, wherein a first plurality of cameras of the set of cameras are affixed to the first vehicles according to respective configurations;
    for each image in the set of images, identifying a training output for the image;
    for one or more images in the set of images, generating an augmented image for a set of augmented images by:
        generating an augmented image for a set of augmented images by modifying the image with an image manipulation function that maintains camera properties of the image, such that angle, scale, and/or pose associated with the image is preserved, and
        associating the augmented training image with the training output of the image;
    training a predictive computer model to predict the training output based on an image training set including the images and the set of augmented images,
    wherein the trained predictive computer model is configured to predict a presence of objects in input images for use in autonomous or semi-autonomous control of a second vehicle, the second vehicle having a second plurality of cameras affixed to the second vehicle according to the respective configurations.

10. The system of claim 9, wherein an individual configuration indicates a same position and/or orientation with respect to the first vehicles and the second vehicle, and wherein consistent image characteristics are included in images captured by a first camera of the first plurality of cameras which is affixed according to the individual configuration and a second camera of the second plurality of cameras which is affixed according to the individual configuration.

11. The system of claim 9, wherein the image training set does not include images generated by image manipulation functions that modify camera properties of an image, and wherein the image manipulation functions that modify camera properties include crop, pad, horizontal or vertical flip, or affine transformations.

12. The system of claim 9, wherein the image manipulation function is cutout, hue, saturations, value jitter, salt and pepper, domain transfer or any combination thereof.

13. The system of claim 9, wherein the image manipulation function is a cutout applied to a portion of the image, wherein a location of the cutout is selected based on an expected view of a first camera, of the first plurality of cameras, with respect to the first vehicles, and wherein the location includes artifacts which are always present in images captured by the first camera.

14. A non-transitory computer-readable medium having instructions for execution by a processor, the instructions when executed by the processor causing the processor to:
  identify a set of images captured by a set of cameras which are affixed to one or more first vehicles, wherein a first plurality of cameras of the set of cameras are affixed to the first vehicles according to respective configurations;
  for each image in the set of images, identify a training output for the image;
  for one or more images in the set of images, generate an augmented image for a set of augmented images by:
    generate an augmented image for a set of augmented images by modifying the image with an image manipulation function that maintains camera properties of the image, such that angle, scale, and/or pose associated with the image is preserved, and
    associate the augmented training image with the training output of the image;
  train a computer model to learn to predict the training output based on an image training set including the images and the set of augmented images,
  wherein the trained predictive computer model is configured to predict a presence of objects in input images for use in autonomous or semi-autonomous control of a second vehicle, the second vehicle having a second plurality of cameras affixed to the second vehicle according to the respective configurations,
  and wherein an individual configuration indicates a same position and/or orientation with respect to the first vehicles and the second vehicle, and wherein consistent image characteristics are included in images captured by a first camera of the first plurality of cameras which is affixed according to the individual configuration and a second camera of the second plurality of cameras which is affixed according to the individual configuration.

15. The non-transitory computer-readable medium of claim 14, wherein the image training set does not include images generated by image manipulation functions that modify camera properties of an image.

16. The non-transitory computer-readable medium of claim 15, wherein the image manipulation functions that modify camera properties include crop, pad, horizontal or vertical clip, or affine transformations.

17. The non-transitory computer-readable medium of claim 14, wherein the image manipulation function is cutout, hue, saturations, value jitter, salt and pepper, domain transfer or any combination thereof.

18. The non-transitory computer-readable medium of claim 14, wherein the image manipulation function is a cutout applied to a portion of the image, wherein a location of the cutout is selected based on an expected view of a first camera, of the first plurality of cameras, with respect to the first vehicles, and wherein the location includes artifacts which are always present in images captured by the first camera.

19. The non-transitory computer-readable medium of claim 14, wherein the image manipulation function is a cutout applied to a region that partially overlaps with the location of the training output in the image, the cutout being a solid color and the cutout being blended with regions near the cutout.

20. The non-transitory computer-readable medium of claim 14, wherein the image manipulation function is a cutout applied to a portion of the image, wherein a location of the cutout is selected based on an expected view of a first camera, of the first plurality of cameras, with respect to the first vehicles, and wherein the location includes a center of the image which depicts a direction of travel.

\* \* \* \* \*